(12) United States Patent
Neubauer et al.

(10) Patent No.: US 6,170,352 B1
(45) Date of Patent: Jan. 9, 2001

(54) ACTUATING ARRANGEMENT

(75) Inventors: Dirk Neubauer, Nachrodt-Wiblingwerde; Klaus-Jörg Breuer, Bochum; Detlef Axmacher, Iserlohn, all of (DE)

(73) Assignee: AFT Atlas Fahrzeugtechnik, Werdohl (DE)

( * ) Notice: Under 35 U.S.C. 154(b), the term of this patent shall be extended for 0 days.

(21) Appl. No.: 09/213,944

(22) Filed: Dec. 17, 1998

(30) Foreign Application Priority Data

Dec. 18, 1997 (DE) .............................. 197 56 403

(51) Int. Cl.$^7$ .......................... B60K 20/02; F16H 59/02; F16H 61/26

(52) U.S. Cl. .................... 74/473.11; 74/473.21; 74/335

(58) Field of Search .............. 74/473.21, 473.23, 74/473.26, 473.28, 335, 473.11, 473.12, 526

(56) References Cited

U.S. PATENT DOCUMENTS

| | | | |
|---|---|---|---|
| 1,250,355 | * 12/1917 | Robinson et al. | ................. 74/473.22 |
| 2,684,600 | * 7/1954 | Naumann | ........................ 74/473.26 |
| 5,060,538 | * 10/1991 | Schnell et al. | .................... 74/473.28 |

FOREIGN PATENT DOCUMENTS 4-138924 * 5/1992 (JP) .

* cited by examiner

Primary Examiner—Thomas R. Hannon
Assistant Examiner—William C. Joyce
(74) Attorney, Agent, or Firm—Darby & Darby

(57) ABSTRACT

An operating device for an automated gear box having a shift gate with a selector slot, three or more shift slots intersecting the selector slot, and an actuator for actuating a gear or shifting shaft in shifting motions. The shifting shaft has a pin or shaft extending through the shift gate. A blocking device with one or more blocking elements moveable generally along the selector slot allows movement of the pin to an adjacent shift slot and shifting within the shift slot by the actuator while blocking further movement of the pin along the selector slot upon engaging a blocking element.

7 Claims, 2 Drawing Sheets

ACTUATING ARRANGEMENT

BACKGROUND OF THE INVENTION

1. Field of the Invention

The invention relates to automated gear boxes, and more particularly, to automated gear boxes operated by means of actuators.

2. Description of Related Art

Automated gearboxes in which a conventional manual gearbox is operated by means of actuators and connected to the engine of a motor vehicle by way of an automatic clutch are becoming increasingly important. They are less expensive than automatic gearboxes which are equipped with hydrokinetic torque converters and operate with planet gears, and the automated gearboxes operate with a higher degree of efficiency.

SUMMARY OF THE INVENTION

An object of the invention is to provide an operating device for an automated gearbox which renders it possible to achieve a high degree of operating reliability and can operate with simple actuators.

This object is accomplished with the features of the claim 1 or 2. With the actuating device according to the invention, a blocking of the mobility of the gear shaft is achieved such that, in spite of the presence of at least three shift slots, it is possible to use stepless selector actuator the drive of which can be reversed in two opposing directions and the movement amplitude of which is defined not by a complex stepped control but rather by blocking the further mobility of the gear shaft by means of the blocking device or the end of the selector slot.

BRIEF DESCRIPTION OF THE DRAWINGS

The invention will now be described in greater detail with reference to the accompanying schematic drawings.

There are shown in.

DESCRIPTION OF THE PREFERRED EMBODIMENTS

Figure 1:
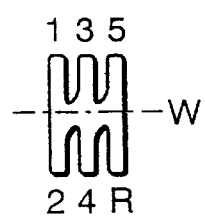
FIG. 1 a shift gate for a gearbox having three shift slots.

As shown in FIG. 1, a shift gate of a gearbox has three shift slots with gears 1, 2; 3, 4 and 5, R which are communicatively connected with each other by way of a selector slot W. In a conventional manual gearbox, such a shift gate determines the mobility of the selector lever; in an automated gearbox, the shift slot determines the mobility of a stop pin rigidly attached to a gear shaft.

Figure 2:
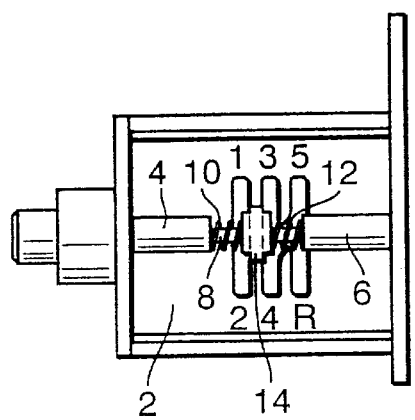
FIG. 2 a plan view of the elements of a blocking device provided in the operating device for a gearbox with three shift slots, FIG. 3 a side elevational view of the blocking device in FIG. 1 with further elements of the operating device, FIG. 4 the shift gate of a gearbox with four shift slots, FIG. 5 a plan view of a blocking device contained in the operating device for the gearbox with four slots, and FIG. 6 a side elevational view of the device which is shown in FIG. 5.

FIG. 2 shows the shift gate recessed into a base plate 2. Above the base plate 2 and between two stop pegs 4 and 6, there is provided a guide pin 8 on which a blocking element 14 is movably guided between two springs 10 and 12. The blocking element 14 has a lug 16 (see FIG. 3) which ends directly above the base plate 2, which has a width approximating that of the selector slot W, and which can move along the selector slot.

Figure 3:
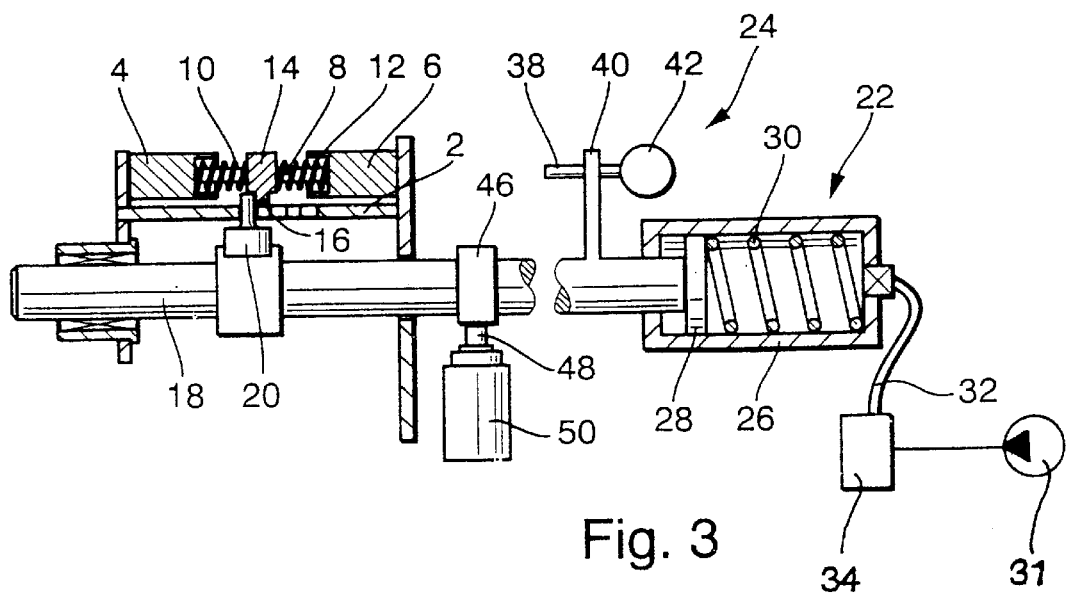

FIG. 3 further shows that, below the base plate 2, on a housing, a shifting shaft 18 is guided for rotary and axial movement relative thereto. Rigidly attached to the shifting shaft 18 is a stop pin 20 which extends into the shift gate and determines the extent of mobility of the shifting shaft 18. To drive the shifting shaft 18, which cooperates in a known manner with a gearbox (not shown), there are provided a selector actuator 22 as well as a shift actuator 24.

The selector actuator 22 comprises a cylinder 24 for a reciprocable piston 28 which is attached to one end portion of the shifting shaft 18. The piston 28 is biased in a direction to the left, as viewed in FIG. 3, by a coil spring 30. By way of a valve 34, which is operated by a control unit, and a conduit 32, the right-hand chamber of the cylinder 26 can be subjected to subatmospheric pressure in order to overcome the bias of he spring 30 and to move the piston 28 in a direction to the right, together with the shifting shaft 18. The valve 34 can connect the conduit 32 with the suction intake of a vacuum pump 31.

To turn or index the shifting shaft 18 relative to the cylinder 26, the selector actuator 24 comprises a pin 38 which is movable at right angles to the plane of FIG. 3 between the tines of a fork 40 which is attached to the shaft 18. In order to move the pin 38 toward or away from the observer of FIG. 3, there is provided a double-acting cylinder 42 (or an equivalent motor). When the piston of the cylinder 42 is in a position of rest, the shifting shaft 18 is indexed to an angular position in which the stop pin 20 is located in the selector slot W. The piston in the double-acting cylinder 42 has two end positions in each of which the selector pin 20 is located at a different end of the then aligned shift slot.

The shifting shaft 18 is further provided with a collar 46 which can be arrested in a predetermined axial position of the shaft 18, and in a manner to be explained hereinafter, by means of a bolt 48 which can be activated by an electromagnet 50.

The mode of operation of the aforedescribed operating device is as folows:

Let it be assumed that the parts of the operating device are held in the positions which are shown in FIG. 3, i.e., the blocking element 14 is maintained in its position of rest at which time the lug 16 registers with the selector slot W exactly between the first shift slot (gears 1 and 2) and the second shift slot (gears 3 and 4). The right-hand chamber of the cylinder 26 is not maintained below atmospheric pressure so that the spring 30 is free to bias the piston 28 in a direction to the left whereby the stop pin 20 registers with the first shift slot because it is located in the left-hand end portion of the selector slot W and is ready to shift the transmission into the first gear 1 or into the second gear 2. If the second shift slot is selected, the right-hand chamber of the cylinder 26 is connected with the suction generating device 31 by way of the valve 34 and the lug 16 moves along the selector slot W until the stop pin 20 reaches a position of alignment with the shift slot for the gears 4 gears 3 and 4. The lug 16 is then prevented from moving in a direction to the right beyond the position in which the stop pin 20 registers with the median shift slot because the element 14 abuts the stop peg 6.

In order to actually shift into the gear 3 or 4, the stop pin 20 releases the lug 16 so that the blocking element 14 returns to its position of rest. With the gear 3 or 4 ready to be engaged, bolt 48 is moved by the lifting electromagnet 50 in a direction toward the shifting shaft 18 and the valve 34 permits the pressure in the right-hand chamber of the cylinder 26 to rise. The spring 30 is free to push the piston 28 and the shaft 18 in a direction to the left but only until the left-hand end face of the collar 46 reaches and abuts the bolt 48. Such operation ensures that the stop pin 20 remains in register with the median shift slot (gears 3 and 4). In order to change to the third shift slot (gears 5 and R), the right-hand chamber of the cylinder 26 is again connected with the suction generating device 31 so that the stop pin 20 can be moved along the selector slot W and into alignment with the third shift slot (gears 5 and R). The selection of R can be blocked or permitted by one or more additional blocking devices, not shown.

If the second shift slot (gears 3 and 4) is to be selected again, the pressure in the right-hand chamber of the cylinder 26 is permitted to rise so that the shaft 18 can be shifted by the resilient element 30 until the collar 46 again reaches and is arrested by the extended bolt 48.

In order to shift from the second or median shift slot to the first shift slot (gears 1 and 2), the electromagnet 50 withdraws the bolt 48 which latter is not acted upon by radial forces because of the shift gate guide of the stop pin 20. The stop pin 20 thereupon moves the control element 14 to the left in the selector slot W against the left-hand stop peg 4 and can be moved along the first shift slot.

Thus, the just described operating device permits an extraordinarily safe gear engagement with actuators which are simple to construct and control with low control complexity.

Figure 4:
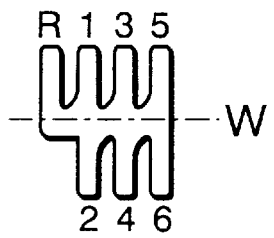
Figure 5:
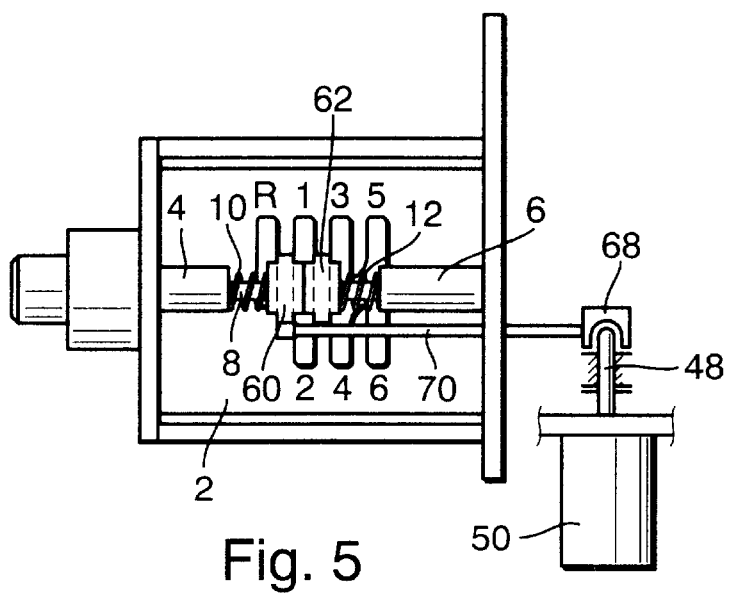
Figure 6:
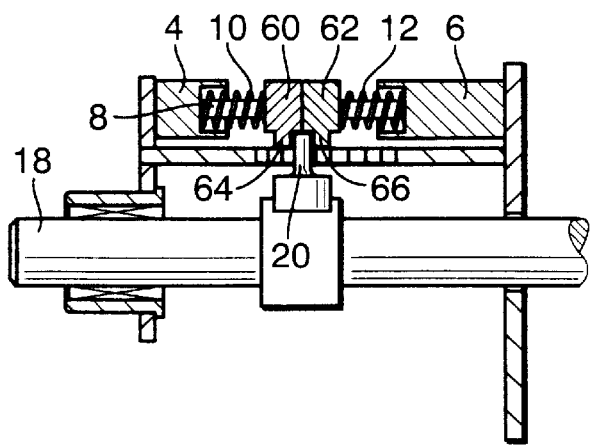

FIGS. 4 to 6 illustrate a further design form of an operating device, namely for a gearbox with four shift slots (R; 1, 2; 3, 4; 5, 6) and one selector slot W (see FIG. 4).

For components of identical design as those shown in FIGS. 1 to 3 or performing the same function, the same reference characters are used so that only the differences are explained.

Two blocking elements 60 and 62 are guided on a guide pin 8 between springs 10 and 12 and, when in a position of rest, their lugs 64 and 66 are aligned with the selector slot W (identified in FIG. 4) between the first shift slot (R) and the second shift slot (1, 2) or between the second shift slot and the third shift slot (3, 4). Lugs 64 and 66 of the blocking elements 60 and 62, forced into mutual contact by the springs 10 and 12, hold between them in the rest position the stop pin 20 of the shifting shaft 18.

The blocking device which, in the embodiment of FIGS. 1 to 3, includes the electromagnet 50, the bolt 48 and the collar 46, again includes an electromagnet 50 and a bolt 48; however, the bolt 48 of FIG. 5 cooperates with a blocking socket 68 provided on a rod 70 which is movably mounted in a housing and is attached to the blocking element 60.

The mode of operation of the device shown in FIGS. 4 to 6 (the actuators for the shifting shaft 18 are not shown) is as follows:

In the illustrated position, the bolt 48 engages the blocking socket 68 and thus fixes the left-hand blocking element 60 between the first and second shift slots. A shifting of the gearbox into the first shift slot, i.e., selection of reverse gear R, is excluded.

If the reverse gear is to be selected, the bolt 48 is withdrawn from the blocking socket 68 by deenergization of the electromagnet 50 which preferably takes place while the first or second gear is still engaged so that the bolt 48 is not acted upon by lateral forces due to the fact that the stop pin is confined in the first shift slot.

If the shift actuator (not shown in FIGS. 4 to 6) is no longer activated, the stop pin 20 moves into the selector slot W and carries the blocking element 60 in a direction to the left, with selector shaft 18 impacted to the left by the selector actuator, not shown, so that the blocking element 60 comes to rest at the stop peg 4 and selection of reverse gear is made possible. When the reverse gear is engaged, the blocking element 60 is moved back into the rest position by the spring 10.

For changing from the first shift slot to the second shift slot, the two blocking elements 60 and 62 are moved to the right from the stop pin 20 which now lies at the left at lug 64, so that the blocking element 62 comes to rest at the right-hand stop peg 6 and the mobility of the stop pin 20 to the right beyond the second selector slot is blocked. During shifting into the first or second gear, the blocking elements are released and pushed back into the rest position by the right-hand spring 12. Locking bolt 48 again blocks the blocking socket 68 so that shifting between gears 1 and 2 takes place along the blocked blocking element 60.

A further gear changing into the third shift slot now takes place while the fourth shift slot is blocked by the blocking element 62 which is pushed against the right stop peg 6 during the selection process. If one of the gears 3 and 4 is selected, the blocking element is pushed by via spring 12 and blocks the second shift slot. Shifting can now take place between the gears 3 and 4, and this shift takes place along the blocking element 62 blocked to the left against further movement by the blocking socket 68. To change to the fourth slot, the shifting shaft 18 is biased to the right where the fourth shift slot can be selected and engaged with the stop pin 20 supported on the right-hand edge.

To change from the fourth shift slot, the shifting shaft 18 is urged to the left as seen in the Figures. To reselect the first shift slot, the blocking socket 68 is released by the bolt 48 so that, on changing to the first shift slot, the two blocking elements 60 and 62 can be moved to the left and after selecting the gear 1 or 2, the starting position shown can be reassumed whereupon the bolt 48 is again moved into the blocking socket 68 so that a shifting between the gears 1 and 2 can take place along the blocking element 60 with the shifting shaft 18 urged to the left.

It will be seen that the operating device of FIGS. 4 to 6 can function with a stepless selector actuator which biases the shifting shaft either in one or the other direction.

Naturally, the operating device can be modified in many ways. The blocking device can function hydraulically. The selector actuator can work with positive pressure or it can use two springs of which either the one or the other is activated. By utilizing several blocking elements and a blocking device interacting with the shifting shaft and/or the blocking elements, shift gates with more than four shift slots can be utilized, etc.

An operating device for an automated gearbox comprises a shift gate with one selection slot and at least three shift slots extending at least substantially at right angles to the selection slot, a shifting gear shaft which is rigidly connected with a stop pin extending through the switch gate, a selection actuator for moving the shifting shaft in the selection direction, a shift actuator for moving the shifting shaft in the shift direction, and a blocking device for blocking the mobility of the stop pin along the selection slot such that a change from one shift slot to an adjacent shift slot is possible and within each shift slot shifting is possible with the shifting shaft biased in one direction by the selection actuator.

The patent claims submitted with the application are proposed formulations without prejudice for the achievement of additional patent protection. The applicant reserves the right to claim further features heretofore disclosed only in the specification and/or in the drawings.

The back-references used in the dependent claims refer to further developments of the subject matter of the parent claim by the features of the respective dependent claim; they are not to be regarded as a waiver of the achievement of objective independent protection for the features of the respective dependent claims.

On the contrary, the features recited in the dependent claims constitute independent inventions which have a status independent of the features of the preceding dependent claims.

Moreover, the invention is not limited to the described embodiments. On the contrary, within the framework of the invention, numerous modifications and deviations are possible, in particular such variants, elements and combinations and/or materials which are novel for example by combination of or deviation from features or elements or process steps described individually in connection with those described in the general description and design forms and claims and contained in the drawings, and lead by combinable features to a new object or new process steps or process step sequences, even where these concern production, testing and modes of operation.

What is claimed is:

1. Operating device for an automated gearbox, comprising a shift gate with a selector slot and at least three shift slots at least substantially perpendicular to said selector slot, a shifting shaft which is rigidly connected with a stop pin extending through said shift gate, a selector actuator for moving said shifting shaft in a shift direction and a blocking device having at least one blocking element movable at least substantially parallel to said selector slot and engagable with said stop pin for blocking the movement of said stop pin along said selector slot such that it is possible to change from one shift slot into an adjacent shift slot, and within each shift slot shifting is possible with the shifting shaft biased in one direction by said selector actuator.

2. Operating device according to claim 1, said at least one blocking element being movable between two stops and being urged elastically into a rest position, said blocking element being carried by said stop pin when the stop pin is moved along said selector slot, said blocking element further having two stop positions in one of which the blocking element blocks the movement of said stop pin into one of two end shift slots forming part of said at least three shift slots, and a locking device for blocking at least one of (a) the mobility of said blocking element and (b) axial mobility of said shifting shaft.

3. Operating device according to claim 2, wherein said shift gate has first, second and third shift slots and, when in said rest position, said blocking element is disposed between said first and said second shift slots, said blocking element facing toward said first shift slot in a first end position thereof to thus clear the path for movement of said stop pin into said first shift slot, said blocking element further having a second end position in which said element blocks the path for movement of said stop pin into said third shift slot, said locking device being arranged to block the mobility of said stop pin from said second into said first shift slot.

4. Operating device according to claim 3, wherein said locking device comprises a component connected to said shifting shaft.

5. Operating device according to claim 2, wherein said shift gate has first, second, third, and fourth shift slots, said first shift slot facing one of said two stops and said fourth shift slot facing the other of said two stops, and said blocking device has first and second blocking elements which are resiliently urged against each other, said first blocking element having a rest position between said first and said second shift slot and said second blocking element having a rest position between said second and said third shift slot, said first blocking element being arranged to permit entry of said stop pin into said first shift slot when said first blocking element is at the stop facing said first shift slot and said second blocking element preventing the entry of said stop pin into said fourth shift slot when said second blocking element is at the stop facing said fourth shift slot, the rest position of said first blocking element being blockable by said locking device.

6. Operating device according to claim 2, wherein said locking device comprises a bolt which can be moved by means of an electromagnet.

7. Operating device according to claim 1, wherein said selector actuator comprises resilient means which urges said shifting shaft in the direction of one of said shift slots, and a vacuum generating device by means of which said shifting shaft can be moved against the opposition of said resilient means.

* * * * *